Nov. 24, 1925.

W. DILL

HOG TROUGH

Filed Oct. 3, 1922

1,562,620

INVENTOR.
William Dill,
BY James T. Parker
ATTORNEY.

Patented Nov. 24, 1925.

1,562,620

UNITED STATES PATENT OFFICE.

WILLIAM DILL, OF RUSHVILLE, INDIANA.

HOG TROUGH.

Application filed October 3, 1922. Serial No. 592,084.

*To all whom it may concern:*

Be it known that WILLIAM DILL, a citizen of the United States, residing at Rushville, Indiana, has invented certain new and useful Improvements in Hog Troughs, of which the following is a specification.

This invention comprehends generally improvements in that class of inventions known as animal husbandry and more particularly relates to a hog trough.

Considerable difficulty has been occasioned by farmers in watering and feeding brood sows owing to the tendency on the part of the animal, when penned, to upset the trough containing the water or food. Previous attempts to provide a satisfactory hog trough have not fulfilled the ideal requirements of farmers or hog raisers inasmuch as the sows have been able to upset or displace the water or food from the trough when rooting, or by lying on the same, while in addition the troughs are often bent or broken due to the weight of the animal when lying thereon.

It is the primary aim and object of this invention to provide a trough of novel construction adapted to contain water or food in a manner that it cannot be upset, nor the contents displaced by the animal either by rooting or lying thereon, the trough being especially adapted for use for brood sows, when penned, thereby acting as a labor saver for the attendant, while in addition the construction is such that it may be cheaply manufactured and easily cleaned.

The invention as an additional object contemplates the provision of a trough for watering or feeding the sows, wherein the body thereof is constructed with chambers for double use, that is, in the event of contents thereof becoming frozen the trough may be inverted to receive a fresh supply, the sides or walls defining the chambers being shaped to avoid bursting or cracking of the body during the freezing of the contents.

More specific objects of this invention consists in the provision of a hog trough which is cast or formed in one piece of metal of sufficient rigidity to withstand the weight of the hogs and to also construct the body of the trough of a shape that will permit of nesting of several of the troughs together, thereby minimizing space for packing and shipping purposes.

As another object the invention resides in the provision of a hog trough which is highly sanitary in that both receiving surfaces of the metal body are smooth, leaving no points available for the accumulation of germs.

Other objects as well as the nature, characteristic features and scope of the invention will be more readily understood from the following description taken in connection with the accompanying drawings, and pointed out in the claim forming a part of this specification.

The invention is clearly illustrated in the accompanying drawings, in which.

Similar characters of reference are employed in all the above described views to indicate corresponding parts.

Figure 1:
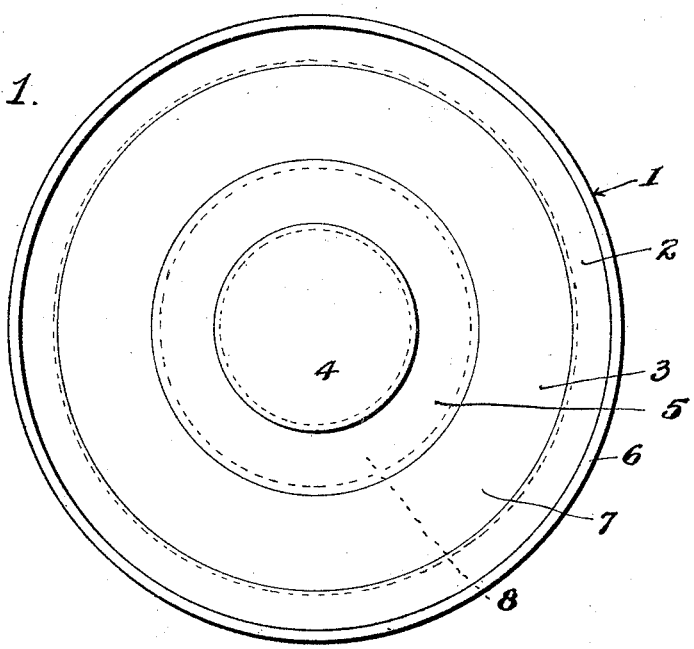
Figure 1 is a top plan view of the improved trough.

Referring now more particularly to the accompanying drawings, there is provided an improved trough, the body of which is indicated generally by the numeral 1, being formed or cast of any desired metal of sufficient rigidity to withstand the weight of a hog and of a suitable shape in plan. As illustrated in the present form which is merely by way of example, the body is of a substantially cylindrical shape, the side walls 2 being tapered or inclined toward the bottom 3, the latter being formed concentrically thereof with a raised central portion 4. This raised portion preferably corresponds in plan to the contour of the body 1 in the present instance being frusto-conical while the walls 5 thereof are inclined or tapered toward the bottom, substantially corresponding to the inclination of the walls 2. The outer surface of the raised portion lies flush with the outer edge of body and also with the corresponding outer face of an external annular flange which is formed about and integral with the wall 2 of the body and owing to the sharp edge successfully prevents sows from lying in the body and spilling the contents thereof. From the foregoing it will be observed that the walls 2 and 5 coact with the bottom 3 in forming an annular chamber 7 adapted to receive water or food when the body is in the position indicated in Figure 2. In the event that the contents become frozen, during the freezing action the inclined walls will allow the contents to creep upwardly thereby obviating the breaking of the body.

Figure 3:
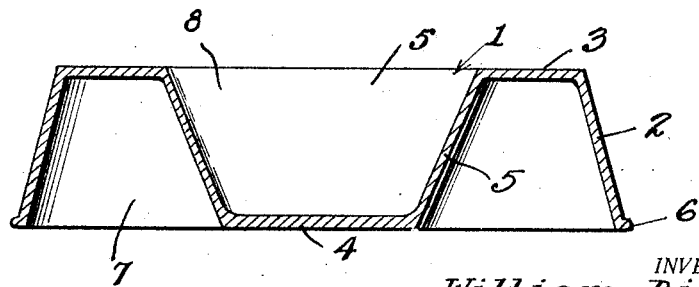
Figure 3 is a similar view showing the body inverted and capable of being further used.

As intimated, the body 1 may be inverted, as illustrated in Figure 3, and when in this position it will be observed that the walls 5 and the portion 4, which rests on the ground, form a central cylindrical chamber 8 adapted to receive an additional supply of water or food.

Figure 2:
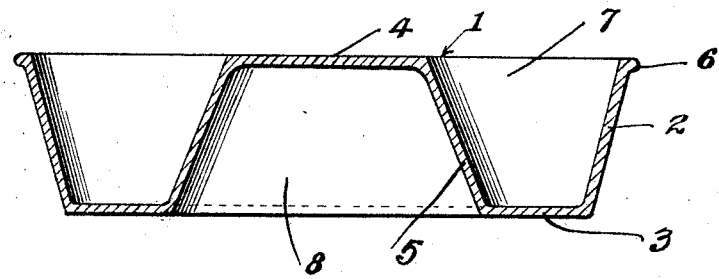
Figure 2 is a vertical transverse sectional view of the same.

It is to also be understood from the foregoing that the trough may be possessed of a relatively large circumference as compared with its height, so that when in the position shown in Figure 2 it will be impossible for a hog or sow to upset the same by placing its nose against the walls 2. Moreover, by being formed of relatively rigid metal it will not be broken when the sow or hog lies thereon and neither will such action effect a displacement of the contents from the chamber. When in the position shown in Figure 3, the outward inclination of the walls 2 prevents the hog from placing its nose under the trough with a view toward upsetting the same, while the area of the chamber 8 is not sufficient to permit of the hog lying therein.

When in the position as shown in Figure 3 the walls 2 and 5 coact with each other in supporting the trough while, when in the position as shown in Figure 2 the portion 4 acts to reinforce the trough. By reason of the inclining of the walls several of the troughs may be arranged in nestable relation to facilitate packing and shipping thereof, as apparent.

As intimated, in view of the smooth surfaces of the double or two way integral trough it is impossible for germs to accumulate. Moreover, as the body is made of metal it may be heated in a fire or otherwise disinfected so as to be maintained in a sanitary condition at all times, thereby reducing to a minimum the spreading of diseases among the hogs, as apparent.

It is believed in view of the foregoing description that a further detailed description is entirely unnecessary. Likewise it is believed that the advantages of the invention will be readily apparent.

Having thus fully described the invention what is claimed as new and desired to be secured by Letters Patent is:

A nestable trough especially adapted for use in feeding brood sows, formed of a single piece of metal and comprising a frusto-conical body, the walls of which are inclined toward the bottom and a frusto-conical raised portion concentrically of the bottom and coacting therewith to refine an annular food or water receiving chamber and having the upper flat surface thereof lying in the plane of the upper edges of the side walls of the body and forming an annular sharpened edge to prevent sows from lying in the chamber and spilling the contents thereof the inclined walls acting as creeping surfaces for frozen contents, and the raised portion also forming an independent water or food receiving chamber upon inversion of the body, substantially as and for the purposes set forth.

In testimony whereof I hereunto affix my signature.

WILLIAM DILL.